May 9, 1933.    F. D. CHAPMAN    1,908,219
ART OF REMOVING SILK FROM CORN
Filed Oct. 13, 1930    3 Sheets-Sheet 1

INVENTOR.
F. D. Chapman
BY
Morsell & Morsell
ATTORNEY.

May 9, 1933.  F. D. CHAPMAN  1,908,219
ART OF REMOVING SILK FROM CORN
Filed Oct. 13, 1930   3 Sheets-Sheet 2
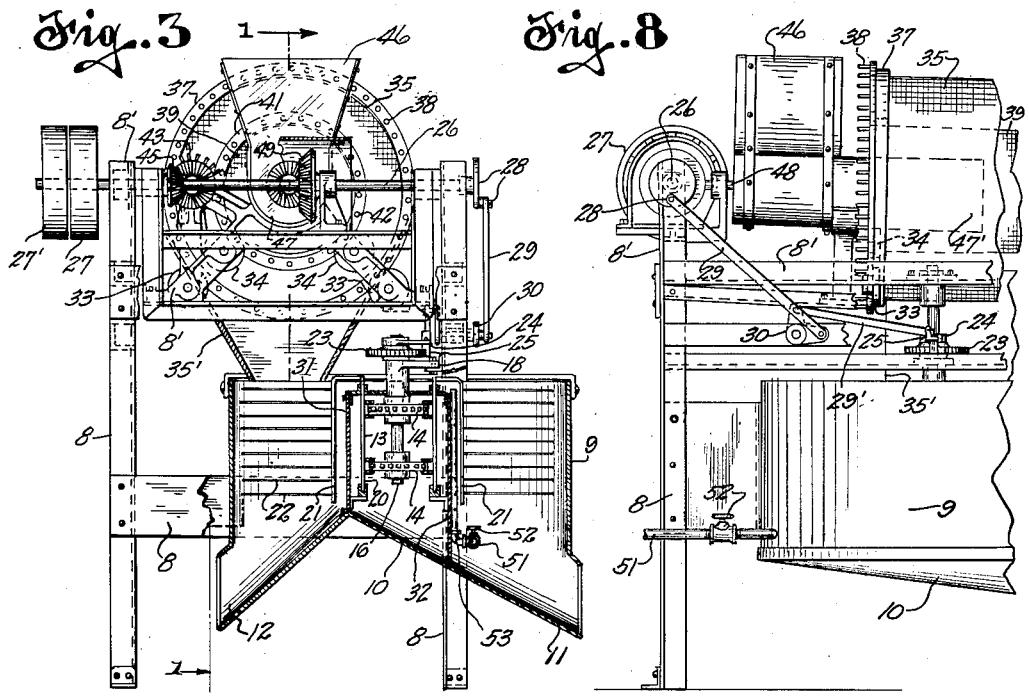
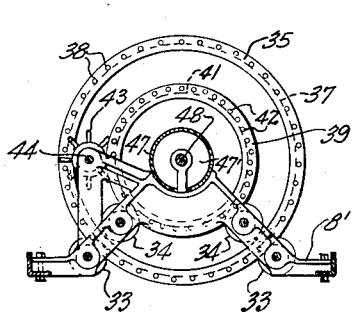
INVENTOR.
F. D. Chapman
BY
Morsell & Morsell
ATTORNEY.

May 9, 1933.  F. D. CHAPMAN  1,908,219
ART OF REMOVING SILK FROM CORN
Filed Oct. 13, 1930   3 Sheets-Sheet 3

INVENTOR.
F. D. Chapman
BY
Morsell & Morsell
ATTORNEY.

Patented May 9, 1933

1,908,219

UNITED STATES PATENT OFFICE

FRANK D. CHAPMAN, OF BERLIN, WISCONSIN

ART OF REMOVING SILK FROM CORN

Application filed October 13, 1930. Serial No. 488,218.

The present invention relates in general to improvements in the art of treating corn after removal thereof from the cobs, and relates more specifically to an improved method of and apparatus for removing the silk from the kernels preparatory to packing the latter in containers.

A general object of the invention is to provide an improved process of removing silk from corn kernels, whereby the objectionable silk fibres are more effectively eliminated than has heretofore been possible.

Another general object of the invention is to provide simple, compact and highly efficient apparatus for automatically exploiting the improved process of removing silk from corn.

It has heretofore been proposed to separate silk from kernels of corn after removal thereof from the cobs, by precipitating the mixture of the silk and kernels over a series of substantially horizontal longitudinally movable wires, to thereby cause the advancing wires to catch the silk fibres and to permit the kernels to fall freely into a hopper disposed beneath the wires. In this prior corn silker, it was attempted to remove the accumulated silk fibres from the longitudinally advancing wires with the aid of scrapers and subsequent sprays of water, the latter being delivered transversely against the wires after removal of the bulk of the silk fibres by the scrapers. The characteristics of corn silk fibres are however such that this prior spraying method did not in fact remove the fibres from the wires, but caused the same to cling more closely and tenaciously to the surfaces of the wires.

In my prior Patent #1,834,047, granted December 1st, 1931 is shown an improved corn silker wherein the use of undesirable scrapers is avoided, and the silk fibres are effectively collected upon transversely moving wires or tines, being subsequently more effectively and completely removed by means of jets of water or other fluid delivered longitudinally along the wires and toward their free outer extremities. With this improved silker, the fibres are not only more effectively removed from the kernals and collected upon the wires which move laterally through the path of the falling mixture, but the collected fibres are also quickly and effectively removed from the wires by the fluid jets.

It is a more specific object of the present invention to provide various improvements in the details of construction of corn silkers of the general type shown in said prior patent, whereby the structure of such devices is simplified and the efficiency thereof is enhanced to a maximum.

A further specific object of the invention is to provide a corn silker in which the various parts are readily accessible and removable for cleaning purposes, thus introducing minimum delay in restoring the machine to operating condition.

Still another specific object of the invention is to provide a silking machine wherein the falling mixture of silk fibres and kernels, is subjected to a relatively large number of silk removing wires or tines within a relatively confined space, and in which the silk is automatically and effectively removed from the collecting tines.

These and other objects and advantages of the present invention, will appear from the following detailed description.

Some of the novel features of corn silker construction, disclosed but not specifically claimed herein, form the subject of said patent.

A clear conception of the several steps of the improved method, and of the details of construction and mode of operation of one form of apparatus capable of exploiting the improved method, may be had by referring to the drawings accompanying and forming a part of this specification in which like reference characters designate the same or similar parts in the various views:

Fig. 3 is a transverse vertical section through the improved corn silker, taken along the line 3—3 of Fig. 1;

Fig. 7 is a fragmentary transverse vertical section through the improved corn silker, the section being taken on the line 7—7 of Fig. 1; and Fig. 8 is a rear view of a fragment of the machine, showing the means for intermittently advancing the tine carrying belt.

Figure 1:
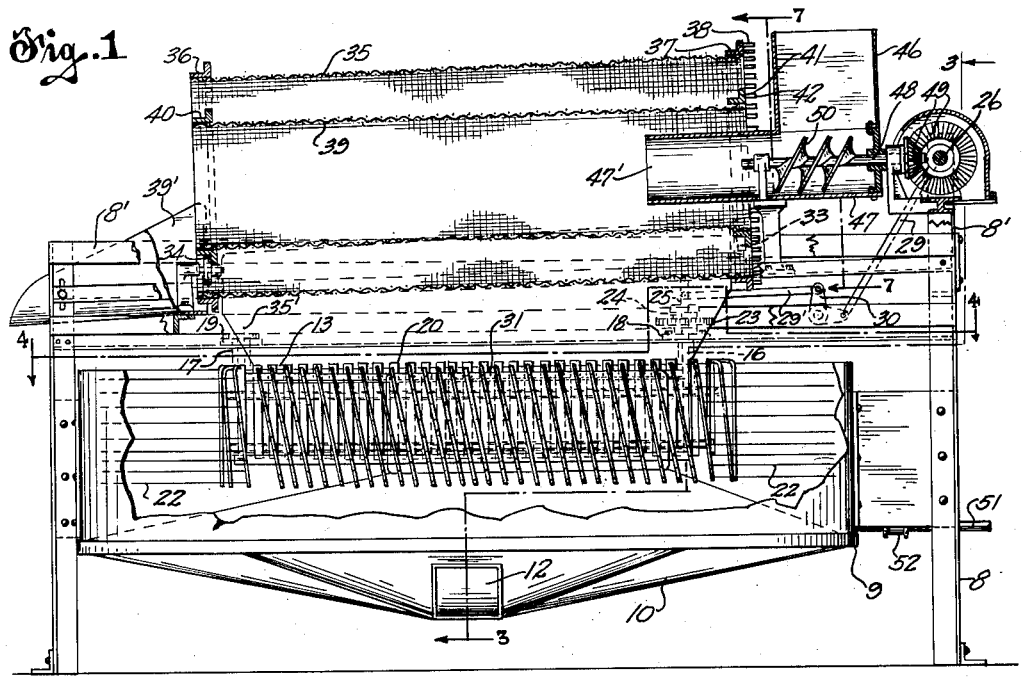
Fig. 1 is a central longitudinal section through an improved corn silker, the section being taken along the line 1—1 of Fig. 3.
Figure 2:
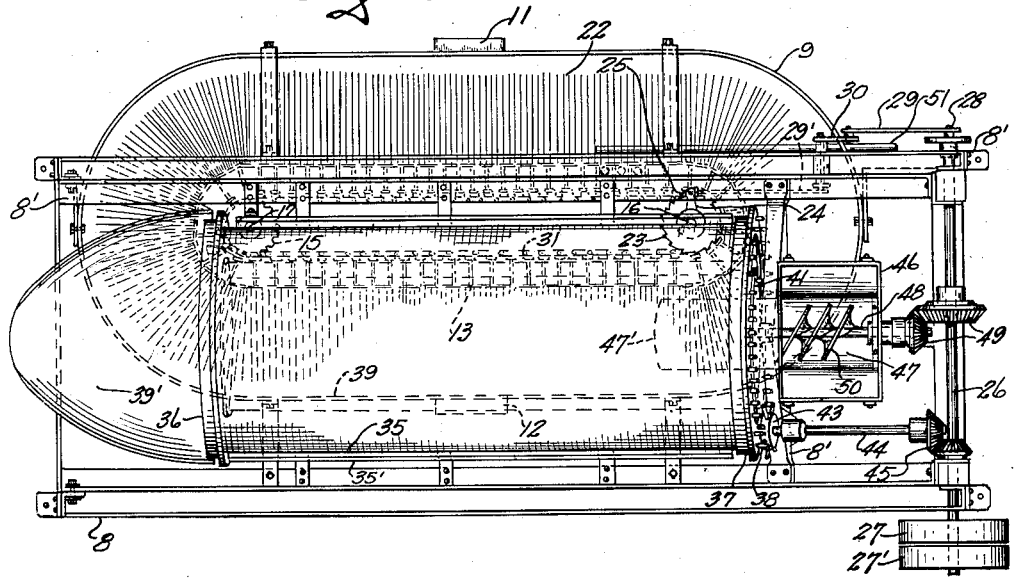
Fig. 2 is a top view of the improved corn silker shown in Fig. 1.
Figure 4:
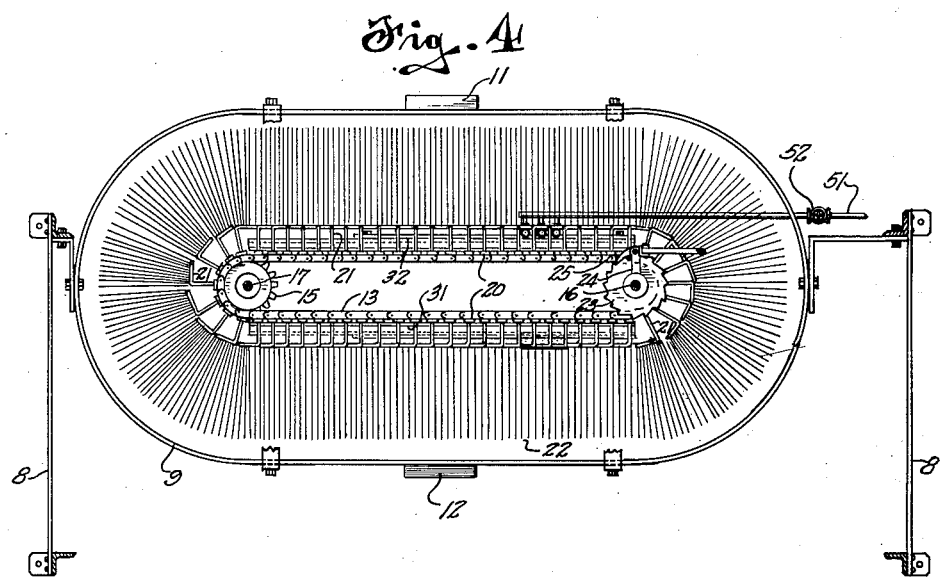
Fig. 4 is a transverse horizontal section through the improved corn silker, the section being taken along the line 4—4 of Fig. 1.

Referring specifically to the drawings showing one embodiment of corn silker adapted to automatically exploit the improved process, the main rectangular frame 8 has an upper portion 8' disposed some distance above the lower portion thereof. An oval tank or receptacle 9 is mounted midway between the upper and lower portions of the frame, and has its bottom portion 10 inclined downwardly and outwardly toward oppositely disposed discharge spouts 11, 12 located at the opposite sides of the receptacle 9. The spout 11 is adapted to discharge the silk fibres, cleansing water, and other foreign particles, while the spout 12 is adapted to discharge the cleansed kernels of corn. An endless belt member 13 is positioned within the receptacle and extends around spaced sets of sprocket wheels 14, 15 which are mounted on vertical shafts 16, 17. The shafts 16, 17 are journaled in brackets 18, 19 supported upon the main frame 8. The shafts 16, 17 are moreover spaced apart horizontally to substantially aline the belt member 13 with the interior of the confining receptacle, and the sprocket wheels of each set are spaced apart vertically so as to engage the end portions of the vertical slats 20 forming part of the belt member 13. The upper portions of the slats are provided with outwardly and downwardly extending arms 21 consisting of metal rods, and each of these rods is provided with outwardly extending fibre collecting wires or tines 22 formed of relatively thin wire and spaced equi-distant apart vertically to provide a silk removing cage. The arms 21 extend at an oblique angle to the vertical, so as to stagger the tines with respect to each other, and these arms are spaced apart so as to separate the tines approximately the same distance horizontally and vertically, thus insuring complete collection of the silk as the mixture of silk fibres and kernels is precipitated over the laterally advancing tines.

The shaft 16 upon which the sprockets 14 are mounted, extends upwardly through the bearing 18, and is provided at its upper end with a ratchet wheel 23 rigidly attached to the shaft. An arm 24 journaled on the upper end of the shaft 16, has a spring pressed pawl connection 25 with the ratchet wheel, and is adapted to rotate the shaft intermittently. A transverse shaft 26 which is journaled upon the upper portion of the frame 8, is provided with tight and loose pulleys 27, 27' respectively, at one end, and has a disc and wrist pin 28 at its opposite end. The wrist pin 28 is connected with a bell crank lever 30 by means of a connection 29, and the bell crank lever is in turn connected to the outer end portion of the ratchet arm 24 by means of a link 29' in order to transfer intermittent motion from the shaft 26 to the shaft 16.

Spaced partitions 31, 32 extend longitudinally within the tank 9 and are positioned between the outwardly and downwardly extending arms 21 and the slats 20 forming part of the belt member 13, these partitions serving to prevent the corn from being deflected by the tine cleansing sprays toward the water discharge side of the tank, and also serving to prevent the water from being deflected toward the corn discharge side of the tank. The partitions 31, 32 are of less length than the receptacle 9 and the endless belt member 13, so as not to interfere with the rotation of the silk removing cage.

Located upon the corn discharge side of the receptacle 9 and above this receptacle, is a downwardly inclined supplemental frame 8' which is provided with roller bearings 33, 34. A cylindrical open ended and downwardly inclined screen 35 is rotatably supported upon the roller bearings 33, 34, and has a flange 36 at the discharge end thereof which bears against the rollers of the bearing 34 to maintain the screen in position. The upper end of the screen is likewise provided with a flange 37 which engages the rollers of the bearing 33, and the flange 37 is provided with pins 38 by means of which the screen may be revolved about its longitudinal axis and upon the roller bearings 33, 34.

A second annular screen 39 is supported concentrically within the outer screen 35, and is provided at its discharge end with a flanged band 40 which bears upon the roller bearing 34 so as to support and to maintain the inner screen in position. The upper end of the inner screen 39 is also provided with a flanged band 41 bearing against the rollers of the upper roller bearing 33, and this upper end of the inner screen is moreover provided with pins 42 similar to the pins 38 of the outer screen. A pin gear 43 mounted upon a countershaft 44, is positioned between the two sets of pins 38, 42, and imparts rotation to the inner and outer screens 35, 39 through the pins 38, 42 in reverse directions. The countershaft 44 is journaled upon the auxiliary frame 8', and has a bevel gear connection 45 with the transverse shaft 26.

A feed hopper 47 mounted upon the auxiliary frame 8' above the axes of the revolving screens, is provided with a lower chute portion 47 having an open ended extension 47' which projects into the upper end of the inner screen 39 to feed the mixture of corn kernels and silk fibres thereto. A countershaft 48 is connected with the transverse shaft 26 by means of bevel gears 49, and is journaled upon the auxiliary frame 8' extending axially into the circular chute portion 47. A screw conveyor 50 is positioned within the circular chute portion 47, being mounted upon the shaft 48 and being rotatable thereby to positively transport the mixture of corn and silk through the extension 47' and into the inner screen 39. A hopper 35' is interposed between the screen 35 and the corn discharge side of the receptacle 9, so as to direct the corn or other material delivered through the screen 35 into the corn kernel discharge side of the receptacle 9. A short chute 39' is adapted to receive oversize which does not pass through the perforations of the screen 35 and directs such material away from the machine.

Figure 5:
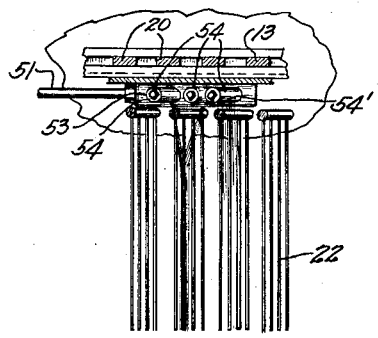
Fig. 5 is a fragmentary enlarged horizontal section through the improved corn silker, the section being taken along the line 5—5 of Fig. 6.
Figure 6:
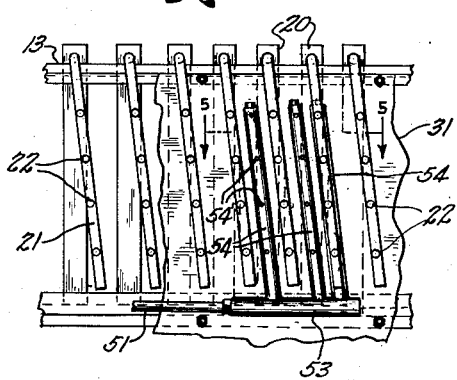
Fig. 6 is an enlarged front view of the fragment of the machine shown in Fig. 5.

A water supply pipe 51 having a control valve 52 therein, is provided with a fitting 53 from which three spaced pipes or jet tubes 54 extend. The tubes 54 extend upwardly within the water and silk fibre discharge side of the receptacle 9, and are disposed at slight angles so as to make them substantially parallel to the arms 27 which travel in close proximity to the tubes. The tubes 54 are spaced apart predetermined distances with respect to the arms 21, and are provided with jet openings 54' disposed in horizontal alinement with the adjacent wires or tines 22 so that the jets of water delivered from the orifices or openings of the tubes will directly impinge against the carrier arms and will strike the tines closely adjacent to the carrier arms thereof so as to force the silk or other foreign matter clinging to the tines, toward the outer free ends thereof. The disposition of the jet forming orifices and the direction of travel of the jets delivered therefrom, is clearly shown in Fig. 5, and it will be noted that two of the three jets comprising each horizontal set, are delivered at opposite slight angles along the intervening tine, while the remaining jet of the series is delivered against the adjacent tine support or arm 21. With this arrangement of the jets, each of the successive tine supports or arms 21 will be subjected to and washed by the single vertical series of jets flowing directly thereagainst, and each tine 22 will subsequently be subjected to and washed by two oppositely directed jets delivered at a slight angle against and along the opposite sides thereof, thus positively removing each bit of foreign matter from each tine support and from the free end of each tine. The successive arms 21 and series of tines 22 are intermittently advanced and are therefore maintained in fixed position during cleansing thereof, and the foreign matter removed from the tines drops away from the outer ends thereof and is discharged with the cleansing water through the spout 11. The intermittent movement of the tines is so timed that during each period of rest, the next succeeding tine supporting arm 21 and series of tines 22 will be positioned in proper relation with respect to the adjacent jets, and that all of the tines will be thoroughly cleansed during their passage through the cleaning chamber.

During normal operation of the corn silker, the mixture of corn kernels and silk fibres is supplied in bulk to the upper hopper 46 and the mixture is advanced by gravity and by the screw conveyor 50 into the inner revolving screen 39. The revolving screen 39 permits the kernels of corn and the silk fibres to pass through the perforations thereof into the outer revolving screen 35, and the pieces of cob and some of the larger silk fibres will be discharged directly over the lower end of the screen 39 into the discharge chute 39' and thus removed from the machine. The outer revolving screen 35 will also separate some of the foreign matter from the mixture of corn kernels and silk fibres, and this removed foreign matter will likewise be discharged from the machine over the chute 39'. The remaining mixture of kernels and silk which passes through the perforations of the outer screen 35 is precipitated through the hopper 35' directly into the path of the advancing tines 22 above the corn discharge spout 12. As the inclined supporting arms position the successive tines 22 in vertically staggered relation with respect to each other, the kernels of corn will naturally follow a zigzag course while passing downwardly between the tines, thus insuring catching of all of the silk fibres between the multiplicity of tines 22. The corn kernels eventually drop from the path of the tines upon the inclined bottom portion of the receptacle 9 and the clean corn is discharged through the chute 12.

The tines 22 to which the silk fibre is clinging, are eventually moved into the cleansing chamber where the jets of water are delivered therealong as previously described. It has been found in actual commercial operation, that the improved corn silker is highly effective. The various parts of the machine are conveniently accessible for cleaning and inspection, and the endless tine supporting band may be readily removed and reinstalled with minimum delay in operation of the machine. The machine is ordinarily furnished with several endless conveyors, so that one may be utilized when the other is being cleaned, and provision is made for maintaining the mechanism in highly sanitary condition at all times. The amount of water required for removing the silk, is relatively small due to the effective method of applying the jets to the tines, and the delivery of the jets longitudinally of the tines insures thorough removal of all foreign matter from the free ends of successive tines.

It should be understood that it is not desired to limit the invention to the exact steps of the method or to the exact details of construction herein shown and described, for various modifications within the scope of the claims may occur to persons skilled in the art.

It is claimed and desired to secure by Letters Patent:

1. In a corn silker, an endless traveling member formed of a series of upright slats having rods depending from the upper portions thereof, said member having oppositely movable rectilineal stretches connected by curved end portions, a plurality of tines projecting laterally from each of said rods and movable thereby, means for precipitating corn over said tines while supported by rods and slats comprising one of said stretches to catch and to remove silk from the kernels, and means for directing jets of liquid along said tines toward the free ends thereof while supported by rods and slats comprising the other of said stretches and while said tines are disposed perpendicular to said other stretch to remove the accumulated silk.

2. In a corn silker, an endless traveling member formed of a series of upright slats and inclined rods depending from the upper ends thereof, said member having oppositely movable rectilineal stretches connected by curved end portions, a plurality of vertically offset tines projecting laterally from each of said rods and movable thereby, means for precipitating corn over said tines while supported by rods and slats comprising one of said stretches to catch and to remove silk from the kernels, and means for directing jets of liquid along said tines toward the free ends thereof while supported by rods and slats comprising the other of said stretches and while said tines are parallel to each other and perpendicular to said other stretch to remove the accumulated silk.

3. In a corn silker, an endless traveling member formed of a series of upright slats and inclined rods depending from the upper ends thereof, said member having oppositely movable rectilineal stretches connected by curved end portions, an endless rail disposed between said slats and rods, a plurality of vertically offset tines projecting laterally from each of said rods and movable thereby, means for precipitating corn over said tines while supported by rods and slats comprising one of said stretches and while said tines are parallel to each other and perpendicular to said stretch to catch and to remove silk from the kernels, and means for directing jets of liquid along said tines toward the free ends thereof while supported by rods and slats comprising the other of said stretches and while said tines are parallel to each other and perpendicular to said other stretch to remove the accumulated silk.

4. In a corn silker, an endless traveling member formed of a series of upright slats and rods depending from the upper ends thereof and disposed at an angle thereto, said member having oppositely movable rectilineal stretches connected by curved end portions, an endless rail coacting with the upper portions of said rods between the rods and the adjacent slats, said slats and certain rods being freely vertically removable from said rail, a plurality of tines projecting laterally from each of said rods and movable thereby, means for precipitating corn over said tines while supported by rods and slats comprising one of said stretches to catch and to remove silk from the kernels, and a series of stationary perforated pipes for directing jets of liquid along opposite sides of the successive tines toward the free ends thereof while supported by rods and slats comprising the other of said stretches to remove the accumulated silk.

5. In a corn silker, an endless traveling member formed of a series of upright slats and rods depending from the upper ends thereof and disposed at an angle thereto, said member having oppositely movable rectilineal stretches connected by curved end portions, an endless rail coacting with the upper portions of said rods between the rods and the adjacent slats, said slats and certain rods being freely vertically removable from said rail, a plurality of tines projecting laterally from each of said rods and movable thereby, means for precipitating corn over said tines while supported by rods and slats comprising one of said stretches to catch and to remove silk from the kernels, and a series of stationary perforated pipes for directing jets of liquid along opposite sides of the successive tines toward the free ends thereof while supported by rods and slats comprising the other of said stretches and while said tines are parallel to each other and perpendicular to said other stretch to remove the accumulated silk.

In testimony whereof, I affix my signature.

FRANK D. CHAPMAN.